Dec. 23, 1952  H. L. BONE ET AL  2,623,163
SPEED RESPONSIVE APPARATUS FOR DETECTING OVERSPEED
Filed Nov. 25, 1947
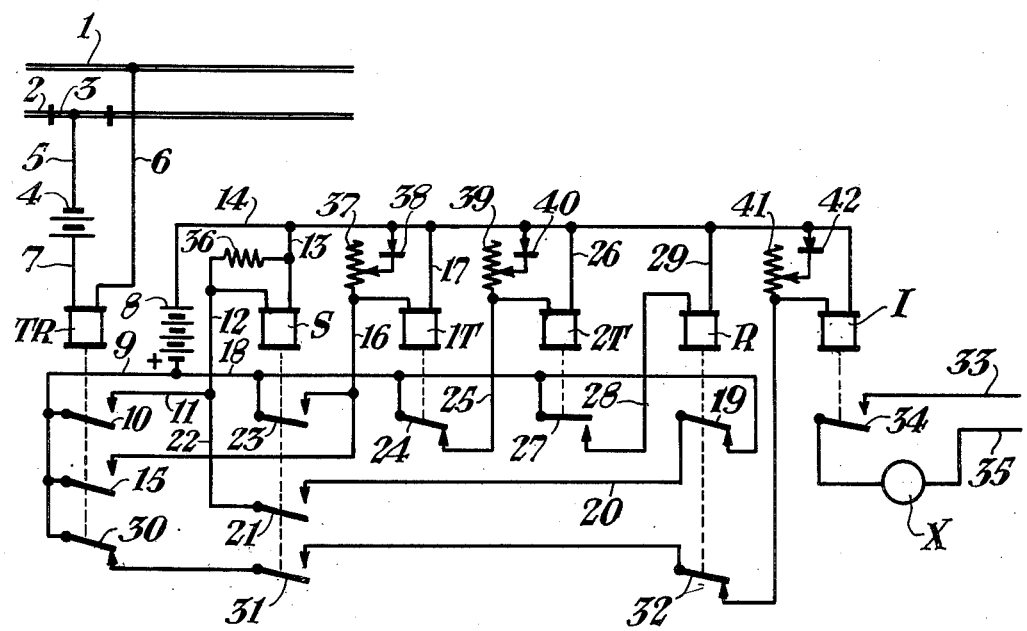
INVENTORS
Herbert L. Bone, Kenneth J. J. McGowan
BY and Arthur E. Dodd.
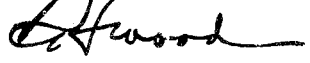
THEIR ATTORNEY Patented Dec. 23, 1952

2,623,163

UNITED STATES PATENT OFFICE 2,623,163

SPEED RESPONSIVE APPARATUS FOR DETECTING OVERSPEED

Herbert L. Bone, Forest Hills, Kenneth J. J. McGowan, Pittsburgh, and Arthur E. Dodd, Edgewood, Pa., assignors to Westinghouse Air Brake Company, a corporation of Pennsylvania Application November 25, 1947, Serial No. 788,060

16 Claims. (Cl. 246—108)

Our invention relates to speed responsive apparatus and particularly to apparatus for giving a signal when the speed of a moving vehicle exceeds a predetermined value. It is illustrated herein a form which may be used to indicate the speed of a car to the tower operator in a railway car retarder yard. Such apparatus may, for example, be used in the approach to a car retarder, or it may be used elsewhere in the yard. This invention is of especial utility in such a system, although it is of general utility as a speed responsive signal.

It has been found difficult for the tower operator in a car retarder yard to estimate accurately the speed of a car approaching a retarder. The operator must estimate the speed of the car in order to control the braking force applied to the car by the retarder. The tower operator is required to watch several cars in different parts of the yard simultaneously, and it is therefore difficult for him to watch any one car long enough to make an accurate estimate of its speed. The problem is not serious for cars moving at low normal rates of speed, but it is essential that cars moving at higher than normal rates of speed be adequately checked by the retarder in order to prevent damage to the cars and their contents.

It is therefore an object of the present invention to provide apparatus for giving a signal when the speed of a moving vehicle exceeds a predetermined value.

Another object is to provide such a system in which the duration of the signal increases with increasing speed of the car.

According to our invention we provide an insulated track section and a timing mechanism which measures an interval of time equal to that required for a car wheel to pass through the track section at a predetermined speed. We then initiate the operation of the timing mechanism when a car wheel enters the track section, and provide a signal which is operated when the car wheel leaves the track section if the time interval established by the timing mechanism has not expired. The signal is operated from the time the car wheel leaves the track section until the expiration of the selected time. Hence the signal operates only when the car speed exceeds a preselected value, and the duration of the signal is an indication of the amount of excess speed over that value.

We shall describe one form of speed signaling apparatus embodying our invention and shall then point out the novel features thereof in claims.

The single figure of the accompanying drawing is a diagrammatic illustration of one form of apparatus embodying our invention.

Referring to the drawing, there is shown a pair of track rails 1 and 2. The rail 2 is provided with an insulated section 3. The insulated track section 3 is connected in a track circuit with a track relay TR. The apparatus also includes a stick relay S, two timing relays 1T and 2T, a repeater relay R, and an indicator relay I.

The indicator relay I controls a circuit through a signal or indicator X, which may be either a visible or audible signal. Where the system is used in a car retarder yard, it is preferred to use an audible signal, since most of the tower operator's visual attention is demanded by the cars in the yard.

The track circuit which energizes relay TR may be traced from the upper terminal of a battery 4, through a wire 5, insulated track section 3, thence through the wheels and axle of a passing car to the track 1, and thence through a wire 6, relay winding TR, and a wire 7 to the lower terminal of battery 4. This circuit is normally open, and is closed only when a wheel of the car is passing through the insulated track section 3, so that the circuit between that track section and the rail 1 is completed through the axle of the car.

Track relay TR controls a pick-up circuit for stick relay S, which may be traced from the lower terminal of a battery 8 through a wire 9, front contact 10 of relay TR, wires 11 and 12, the winding of relay S, and wires 13 and 14 to the upper terminal of battery 8.

Track relay TR also controls a pick-up circuit for timing relay 1T, which may be traced from the lower terminal of battery 8 through wire 9, front contact 15 of relay TR, wire 16, the winding of relay 1T, and wires 17 and 14 to the upper terminal of battery 8.

Stick relay S is provided with a stick circuit which may be traced from the lower terminal of battery 8 through wire 18, back contact 19 of relay R, wire 20, front contact 21 of stick relay S, wires 22 and 12, the winding of relay S, and wires 13 and 14 to the upper terminal of battery 8.

Stick relay S also controls a holding circuit for timing relay 1T. This circuit may be traced from the lower terminal of battery 8, through wire 18, front contact 23 of relay S, wire 16, the winding of relay 1T, and wires 17 and 14 to the upper terminal of battery 8.

Timing relay 1T controls a normally closed energizing circuit for timing relay 2T, which may be traced from the lower terminal of battery 8 through conductor 18, back contact 24 of relay 1T, wire 25, the winding of relay 2T, and wires 26 and 14 to the upper terminal of battery 8.

Timing relay 2T controls an energizing circuit for repeater relay R, which may be traced from the lower terminal of battery 8 through wire 18, back contact 27 of relay 2T, wire 28, the winding of relay R, and wires 29 and 14 to the upper terminal of battery 8.

The pick-up circuit for indicator relay I may be traced from the lower terminal of battery 8 through wire 9, back contact 30 of track relay TR, front contact 31 of stick relay S, back contact 32 of repeater relay R, the winding of relay I, and thence through wire 14 to the upper terminal of battery 8.

The energizing circuit for signal X may be traced from a power supply line 33 through a front contact 34 of indicator relay I, and thence through signal X to power supply line 35. The power supply lines 33 and 35 may be connected to a suitable source of alternating current, to the terminal of the battery 8, or to any other desired source of power.

The stick relay S is provided with a fixed resistance shunt 36 to give it a slow release characteristic. Timing relay 1T is provided with a shunt including a variable resistor 37 and a rectifier 38. Timing relay 2T has a similar shunt including a variable resistor 39 and a rectifier 40, and indicator relay I has a shunt including a variable resistor 41 and a rectifier 42. The rectifiers 38, 40, and 42 are poled to opposed the polarity of battery 8 and to prevent short-circuiting of the relays whenever their associated resistors are set at a low value.

*Operation*

The various parts are shown in the drawing in the positions which they have when the track section 3 is vacant. It should be noted that the timing relay 2T is energized, and that the other relays are all deenergized. The signal X is likewise deenergized.

In order to prevent undue distraction of the tower operator, it is desired that only one signal be given for each truck of a car passing through the track section 3, and that the signal be not disturbed by following axles on the same truck or, when the signal is given by the rear truck of a car, by the adjacent leading axle of a following coupled car.

It will now be assumed that a car enters the track section 3 and passes through it at a speed low enough so that it is in the section for a period of time longer than the release time of relay 2T, which is determined by the setting of resistor 39, and which establishes the minimum speed that will produce a signal. When the first axle of the car enters the track section 3, the circuit of track relay TR is energized, and the track relay picks up, closing the pick-up circuit for relays S and 1T, and opening the circuit of indicator relay I at the front contact 30. Relays S and 1T then pick up simultaneously. The picking up of relay S closes the stick circuit for itself and the holding circuit for relay 1T, and closes contact 31 in the pick-up circuit of indicator relay I.

When relay 1T picks up, it opens the energizing circuit for relay 2T. However, relay 2T, due to the shunt provided by the resistor 39 and rectifier 40, is of the slow releasing type, and its release time is controlled by the setting of adjustable resistor 39. Under the conditions assumed, the car still occupies the track section 3 when the release time of relay 2T expires. When that happens, contact 27 closes the energizing circuit for repeater relay R, which picks up, opening the circuit of indicator relay I at the back contact 32. Relay R simultaneously opens the stick circuit for relay S at the back contact 19. From the foregoing, it may be seen that when the car speed is below the selected value, the circuit of relay I is opened at back contact 32 of relay R before contact 30 of track relay TR closes upon departure of the car from track section 3. Therefore, relay I is not picked up, and signal X is not energized.

No further change takes place in the system until the car wheel passes out of track section 3, opening the track circuit and deenergizing relay TR. Thereupon the pick-up circuits for relay S and relay 1T are opened. Since the stick circuit for relay S was previously opened at contact 19, it now releases its contacts after a time determined by the characteristics of the relay and the value of resistance 36. As soon as stick relay S opens its contacts, the holding circuit for relay 1T is opened, and that relay releases after a time determined by its release characteristic and the setting of resistor 37. When relay 1T releases, closing its back contact 24, the relay 2T is picked up, and the system again is in its normal condition, ready for a new operation.

Let it now be assumed that a car passes through the track section 3 at a speed fast enough so that its leading axle passes out of the track section before the slow release relay 2T has closed its back contact 27. Under such conditions, the relays TR, S, and 1T will be picked up as previously described, but before relay 2T has closed its back contact 27, the axle passes out of the track section 3, thereby deenergizing track relay TR. This closes back contact 30 of that relay. Relay S continues energized through its stick circuit, so that contact 31 remains closed. Repeater relay R remains deenergized, since contact 27 is not yet closed, so contact 32 is also closed. The pick-up circuit for indicator relay I is therefore completed and it picks up, closing contact 34 and thereby energizing the signal X. The condition of relay 2T is not changed by this action, and as soon as its release is completed, contact 27 closes, energizing relay R and opening the pick-up circuit of indicator relay I and contact 32. Hence, the pick-up circuit of relay I is closed for a time equal to the difference between the release time of relay 2T and the time taken by the car axle to pass through track section 3.

It should be noted that the time during which the pick-up circuit for relay I is closed is proportional to the difference between the actual speed of a passing car and the speed determined by the length of track section 3 and the selected release time of relay 2T.

Although the time of energization of indicator relay I is thus made proportional to the excess speed, we prefer to prolong the indication of the signal S beyond the actual time of energization of relay I. This is accomplished by making relay I a slow release relay, and controlling its time release characteristic by means of the variable resistor 41. The actual time of energization of signal X may therefore not be exactly proportional to the amount of excess speed, but it will increase as the excess speed increases.

When relay R is picked up, it opens the front contact 19 in the stick circuit of relay S. Since the pick-up circuit of relay S has been previously opened by deenergization of relay TR, the relays S and 1T then drop out in sequence. The system is then ready to measure the speed of the next car passing through the track section 3.

The release times of stick relay S and timing relay 1T are chosen so that, for the range of train speeds normally encountered in connection with a particular installation, the second axle of a truck or the adjacent axle of a following truck will enter the track section 3 at a time before the timing relay 1T has been released to close its back contact 24. If a following axle enters the track section 3 at such a time, the relays TR, S, and IT will be picked up, but no change will take place in the condition of relays 2T and R. Therefore, such a following axle will produce no signal indication.

The space between axles of a truck varies somewhat from one car to another but is usually about 6 feet. The distance between the last axle on one car and the first axle on a following coupled car is likewise about 6 feet, although it too is somewhat variable. In a particular installation of the illustrated invention, the length of the insulated track section 3 was made to be 3 feet, 1⅛ inches. This length may be varied somewhat, but should be substantially less than the distance between axles. The release times of the relays S and IT may be varied as desired to suit the length of track section 3 and the range of speeds over which it is desired to have the apparatus operate.

It is theoretically possible for a following axle in a group to cut short the duration of a signal, under very high speed conditions. This would happen if the following axle should enter the track section 3 before the energizing circuit of relay I had been opened at contact 32. The entry of the following axle into track section 3 would energize relay TR, opening the circuit of indicator I at contact 30 and thereby decreasing the duration of the speed indicating signal. It should be readily understood, however, that in any given installation, the release times of relays 2T and I and the length of the track section 3 may be designed so that this interference will not take place as long as the car speed being measured remains within a particular range which may be selected as desired.

It should be apparent from the foregoing that we have provided a signaling system which will give a signal whenever the speed of a passing car exceeds a predetermined value. The system may be designed so that for any desired range of speeds, the duration of the signal will indicate the amount of excess speed above that predetermined value. Our apparatus is so arranged, that for a given range of speeds, only one signal is given by each group of axles passing through the track section. Furthermore, for any speed within the selected range, the following axles will not disturb the speed indication produced by the movement of the leading axle.

Although we have herein shown and described only one form of apparatus embodying our invention, it should be understood that various changes and modifications may be made therein within the scope of the appended claims without departing from the spirit and scope of our invention.

Having thus described our invention, what we claim is:

1. Apparatus for indicating that the speed of a railway vehicle through an insulated section of railway track having a length less than the distance between any two axles of the vehicle exceeds a predetermined value comprising, a signal for indicating excessive speed, timing means for establishing a period of time equal to that required for a wheel of said vehicle to move through said track section at a predetermined speed, means effective upon entry of a wheel of said vehicle into said track section to initiate operation of said timing means, means effective at times upon departure of a wheel of said vehicle from said track section to operate said signal, and means including said timing means for preventing operation of said signal after expiration of said period of time so that said signal is operated when and only when a wheel of said vehicle moves through said track section faster than said predetermined speed.

2. Apparatus as in claim 1, including means effective when said signal is operated to continue such operation until it is terminated by said timing means so that for a selected range of speeds the duration of said signal increases with the excess of the actual vehicle speed over the speed at which said vehicle would require all the time determined by the timing means for a wheel to pass through said section of track.

3. Apparatus as in claim 1, in which said track section lies in a car retarder yard, and said signal is located in the car retarder control tower.

4. Apparatus as in claim 3, in which said signal is an audible signal.

5. Apparatus for indicating that the speed of a railway vehicle through an insulated section of railway track having a length less than the distance between any two axles of the vehicle exceeds a predetermined value comprising, a signal for indicating excessive speed, timing means for establishing a period of time equal to that required for a wheel of said vehicle to move through said track section at a predetermined speed, a track circuit including said track section, a relay in said track circuit, means including said relay for initiating operation of said timing means each time the first wheel on any truck of said vehicle enters said track section, a first contact associated with said relay and closed thereby upon departure of each wheel of said vehicle from said track section, a second contact, means including said timing means for operating said second contact so that it remains closed while said timing means is operating and opens upon expiration of said period of time, and a signal controlling circuit effective when energized to cause said signal to indicate excessive speed, said signal controlling circuit including said first and second contacts in series.

6. Apparatus as in claim 5, including a stick relay, a pick-up circuit for said stick relay closed by said track relay when said track section is occupied, a first front contact of said sticker relay connected in series with said first and second contacts to prevent completion of said signal controlling circuit under normal unoccupied track conditions, and a stick circuit for said stick relay including a second front contact thereof and a fourth contact operated simultaneously with said second contact.

7. Apparatus as in claim 5, in which said timing means comprises a slow release relay, and an inverse repeater relay energized through a back contact of said slow release relay for operating said second contact.

8. Apparatus as in claim 5, including means operated concurrently with the opening of said second contact for restoring said timing means to its normal condition, and means for delaying the operation of said restoring means for a predetermined period of time to prevent said track relay from starting operation of said time delay means in response to the entry of the second wheel of a truck into said track section.

9. Apparatus as in claim 5, including a slow release relay connected in said signal controlling circuit and a signal circuit including said signal and controlled by said slow release relay, said slow release relay being effective to prolong the overspeed indication of said signal.

10. Apparatus as in claim 9, including means operated concurrently with the opening of said second contact for restoring said timing means to its normal condition, and means for delaying the operation of said restoring means for a period of time longer than the release time of said slow release relay.

11. Apparatus for indicating that the speed of a vehicle wheel through a predetermined portion of a fixed path of movement exceeds a predetermined value, comprising means operable to indicate excessive speed, timing means for establishing a period of time equal to that required for said vehicle wheel to move through said path portion at said predetermined speed, means effective upon entry of said vehicle wheel into said path portion to initiate operation of said timing means, means effective upon departure of said vehicle wheel from said path portion to operate said indicating means, and means including said timing means for preventing operation of said indicating means after expiration of said period of time.

12. Apparatus for indicating that the speed of a vehicle wheel through a predetermined portion of a fixed path of movement exceeds a predetermined value and the amount of such excess speed, comprising means operable to indicate excessive speed, timing means for establishing a period of time equal to that required for said vehicle wheel to move through said path portion at said predetermined speed, means effective upon entry of said vehicle wheel into said path portion to initiate operation of said timing means, operating means effective upon departure of said vehicle wheel from said path portion to initiate and continue operation of said indicating means, and means including said timing means effective after expiration of said period of time to prevent or terminate operation of said indicating means by said operating means so that the duration of operation of the indicating means is an indication of the amount of excess speed.

13. Railway speed indicating apparatus, comprising an insulated section of railway track having a length less than the distance between any two axles on any truck of a vehicle whose speed is to be indicated, a signal for indicating excessive speed, timing means for establishing a period of time equal to that required for a wheel of said vehicle to move through said track section at a predetermined speed, a track circuit including said track section, a relay in said track circuit, means including said relay for initiating operation of said timing means when a wheel of said vehicle enters said track section, a signal controlling circuit including first and second contacts, each of said contacts being movable between a signal operating position and a signal preventing position, said signal controlling circuit being effective to actuate said signal when and only when both said contacts are in their signal operating positions, said first contact being associated with said relay and moved thereby to its signal operating position upon departure of a vehicle wheel from said section, and means including said timing means for operating said second contact to its signal operating position while said timing means is operating and to its signal preventing position upon expiration of said period of time.

14. Electrical control apparatus, comprising an electrical circuit to be closed whenever the speed of a vehicle wheel through a predetermined portion of a fixed path of movement exceeds a predetermined value, first and second contacts in series in said circuit, timing means for establishing a period of time equal to that required for said vehicle wheel to move through said path portion at said predetermined speed, means effective upon entry of said vehicle wheel into said path portion to initiate operation of said timing means, means effective upon departure of said vehicle wheel from said path portion to close said first contact, and means including said timing means effective upon termination of said period of time to open said second contact.

15. Electrical control apparatus, comprising an electrical circuit to be closed wherever the speed of a vehicle wheel through a predetermined portion of a fixed path of movement exceeds a predetermined value, two normally closed contacts and one normally open contact connected in series in said circuit, timing means for establishing a period of time equal to that required for said vehicle wheel to move through said path portion at said predetermined speed, means effective upon entry of said vehicle wheel into said path portion to initiate operation of said timing means to open one of said normally closed contacts and to close said normally open contact, stick means to hold said normally open contact closed, means effective upon departure of said vehicle wheel from said path portion to close said one normally closed contact, and means including said timing means effective upon termination of said period of time to open the other of said normally closed contacts and to render said stick means ineffective.

16. Apparatus for indicating that the speed of a railway vehicle through an insulated section of railway track having a length less than the distance between any two axles of the vehicle exceeds a predetermined value comprising, a track circuit for said track section including a track relay energized only when the section is occupied by a car wheel, a slow releasing stick relay, a first and a second slow releasing timing relay, a repeater relay, a slow releasing indication relay, a pick-up circuit for said stick relay controlled by a front contact of said track relay, a stick circuit for said stick relay including a front contact of said stick relay and a back contact of said repeater relay, a pick-up circuit for said first timing relay controlled by a front contact of said track relay, a holding circuit for said first timing relay including a front contact of said stick relay, a circuit for said second timing relay controlled by a back contact of said first timing relay, a circuit for said repeater relay controlled by a back contact of said second timing relay, and a pick-up circuit for said indication relay controlled by a back contact of said track relay, a front contact of said stick relay and a back contact of said repeater relay.

HERBERT L. BONE.
KENNETH J. J. McGOWAN.
ARTHUR E. DODD.

REFERENCES CITED

The following references are of record in the file of this patent:

UNITED STATES PATENTS

| Number | Name | Date |
|---|---|---|
| 1,913,699 | Crago | June 13, 1933 |
| 1,958,294 | Bone | May 8, 1934 |
| 2,022,708 | Crago | Dec. 3, 1935 |
| 2,176,866 | Allen | Oct. 24, 1939 |